United States Patent [19]

Kimura et al.

[11] Patent Number: 5,148,291
[45] Date of Patent: Sep. 15, 1992

[54] APPARATUS FOR DISPLAYING IMAGE SIGNAL DROP-OUT

[75] Inventors: Norio Kimura, Tokyo; Tomishige Taguchi, Urawa; Tsuguhide Sakata, Machida; Kunio Tsuruno, Tokyo; Masahiro Takei, Yokohama, all of Japan

[73] Assignee: Canon Kabushiki Kaisha, Tokyo, Japan

[21] Appl. No.: 764,074

[22] Filed: Sep. 23, 1991

Related U.S. Application Data

[63] Continuation of Ser. No. 506,992, Apr. 10, 1990, abandoned, which is a continuation of Ser. No. 346,304, May 2, 1989, abandoned, which is a continuation of Ser. No. 49,514, May 14, 1987, abandoned.

[30] Foreign Application Priority Data

May 21, 1986 [JP] Japan .................... 61-116382
May 21, 1986 [JP] Japan .................... 61-116981

[51] Int. Cl.⁵ ................................ H04N 5/91
[52] U.S. Cl. ........................ 358/336; 358/167
[58] Field of Search ............ 358/36, 167, 314, 336; 360/31, 38.1

[56] References Cited

U.S. PATENT DOCUMENTS

| | | | |
|---|---|---|---|
| 4,250,521 | 2/1981 | Wright | 358/336 |
| 4,287,529 | 9/1981 | Tatami et al. | 360/38.1 |
| 4,315,331 | 2/1982 | Lemoine et al. | 360/38.1 |
| 4,680,658 | 7/1987 | Tatami et al. | 360/38.1 |
| 4,686,563 | 8/1987 | Fountain et al. | 360/31 |
| 4,746,991 | 5/1988 | Efron et al. | 360/31 |

*Primary Examiner*—Donald McElheny, Jr.
*Attorney, Agent, or Firm*—Fitzpatrick, Cella, Harper & Scinto

[57] ABSTRACT

In an image signal processing apparatus, a drop-out period of an image signal is detected while the image signal is stored in a memory, the detected results are stored in another memory. Based on the information stored in the other memory, the signal drop-out period is displayed and the drop-out signal in the image signal is compensated.

32 Claims, 8 Drawing Sheets

APPARATUS FOR DISPLAYING IMAGE SIGNAL DROP-OUT

This application is a continuation of application Ser. No. 07/506,992, filed Apr. 10, 1990, now abandoned, which is a continuation of application Ser. No. 07/346,304, filed May 2, 1989, now abandoned, which is a continuation of application Ser. No. 07/049,514, filed May 14, 1987, now abandoned.

BACKGROUND OF THE INVENTION

1. Field of the Invention

The present invention relates to an image signal processing apparatus, and more particularly to an image signal processing apparatus capable of detecting a drop-out of an image signal, compensating for the drop-out with high fidelity, and displaying information on the drop-out.

2. Related Background Art

Figure 2:
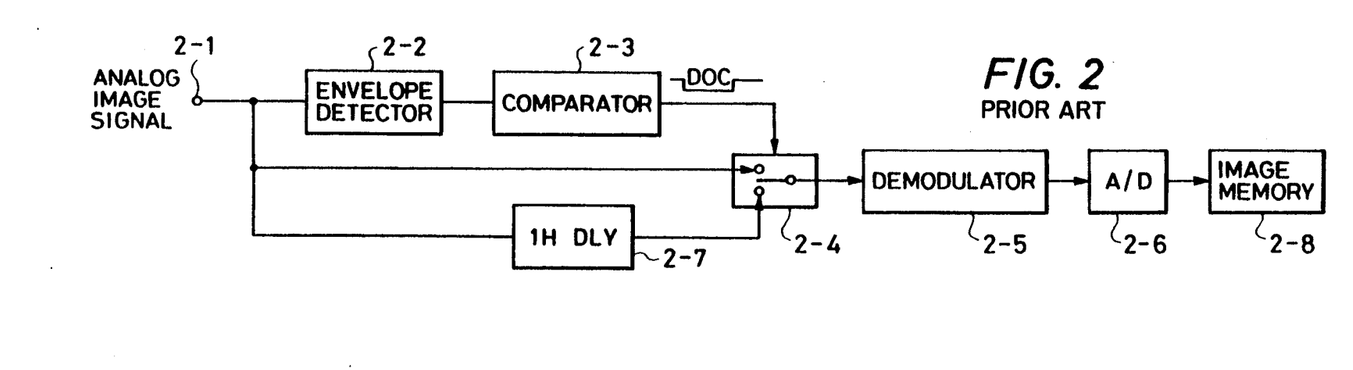
FIG. 2 is a block diagram showing a prior art drop-out compensation circuit using a 1H delay line.

Referring to FIG. 2, in a prior art drop-out compensation circuit for processing analog image signals without using a memory, an FM modulated analog image signal is applied to an input terminal 2-1 and the envelope level thereof is detected by an envelope detector 2-2. The envelope is applied to a comparator 2-3 which generates a drop-out detection pulse DOC when the envelope level reaches a value smaller than a predetermined one, and supplies the drop-out detection pulse DOC to an analog switch 2-7. The analog switch 2-7, which is supplied with a present analog image signal and that delayed by 1H (horizontal period) by a 1H delay line, performs image processing by compensating the drop out of an analog image signal with an analog image signal before 1H period, upon reception of the drop-out detection pulse DOC. An apparatus is known which demodulates the processed signal by a demodulator 2-5 and converts the demodulated signal into a digital signal to store it in an image memory 2-8.

With the above construction, the processed image signal may often have distorted portions at the start and end of the drop-out when the analog switch 4 is operated. Further, it is very difficult to adjust the levels of image signals passing through the 1H delay line and those not passing through it.

Furthermore, since the lack of an image signal is simply replaced with an image signal before period 1H, high quality compensation cannot be expected when a drop-out occurs at the location where the lacked image signal has no substantial correlation with that before period 1H.

Still further, since the lack of an image signal is simply replaced with an image signal before period 1H, compensation is almost impossible when a drop-out occurs during consecutive several horizontal periods. However, the user cannot be notified of such effect. In addition, the range of a drop-out cannot be notified beforehand.

SUMMARY OF THE INVENTION

The present invention aims to eliminate the above prior art problems and provide an image signal processing apparatus capable of compensating the drop out of analog image signals with high fidelity, and particularly provide an image signal processing apparatus capable of compensating image signals even when a drop-out continues for several horizontal periods, and displaying the drop-out status.

According to the present invention, there is provided an image signal processing apparatus which is comprising a means for detecting a drop-out period of an image signal while image signals are stored in a memory, and means for displaying the drop-out period detected by detection means.

It is an another object of the present invention to provide an image signal processing apparatus which is able to promptly compensate for drop-out of image signal.

It is still another object of the present invention to provide an apparatus for compensating drop-out, which is able to be easily applied to a still image transmission apparatus.

The above objects and features and advantages of the present invention will become apparent from the following detailed description with reference to the accompanying drawings.

DETAILED DESCRIPTION OF THE PREFERRED EMBODIMENTS

In the following description of the embodiments according to the present invention, there is disclosed an image processing apparatus of the type that an image signal reproduced from a recording medium is separated, for example, into four colors including red(R), green(G), blue(B) and black(Bk) called "black print" for transmission to another apparatus. However, obviously the present invention is not limited to such an apparatus.

Figure 1:
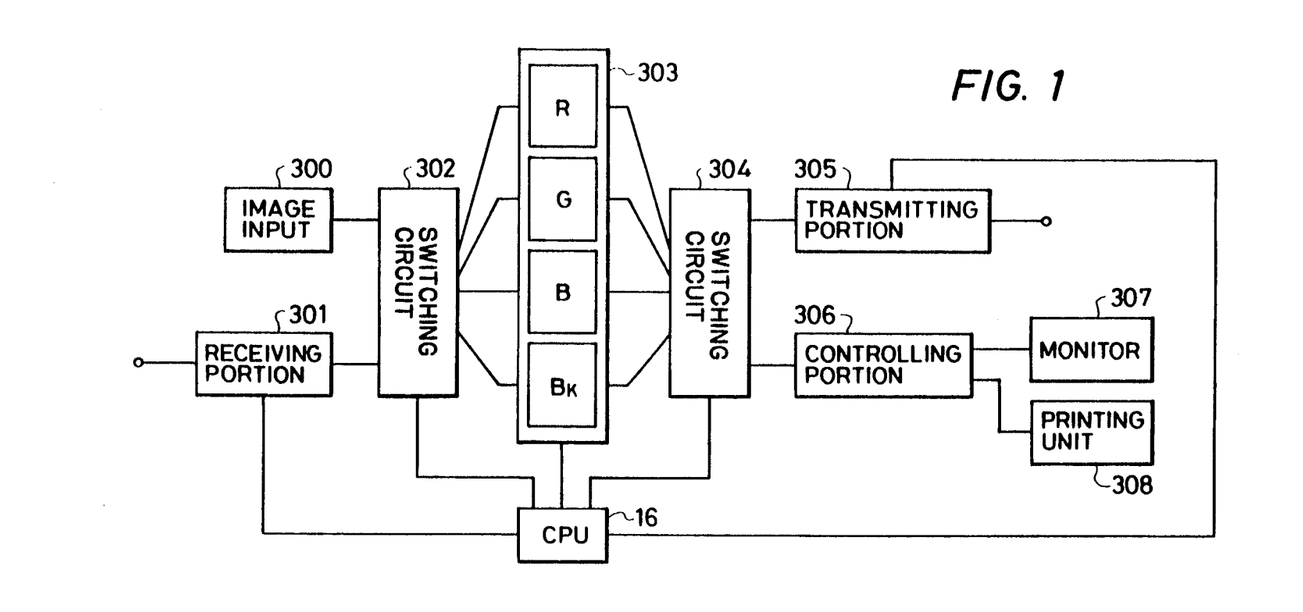
FIG. 1 is a block diagram showing the fundamental circuit portion of a still image transmission apparatus embodying the present invention.

FIG. 1 is a block diagram showing the image processing apparatus of the above type.

In FIG. 1, in a transmission mode, an image signal such as a signal from a video floppy disc or a television signal from an external circuit is inputted to an image input 300. The image signal is converted into digital signals and stored in R, G and B frame memories 303 via a switching circuit 302 under control of a CPU 16. The CPU 16 then causes another switching circuit 304 to be connected to a transmitting portion 305 to which monochrome color (Y), two colors (G, R or B), three colors (R, G and B) and four colors (R, G, B and Bk) are supplied from the R, G and B memories 303, in accordance with a selected transfer mode. In case of the two color transfer mode, R and B color signals are line-sequentially sent.

In a reception mode, the CPU 16 causes the switching circuits 302, and 304 to be switched to a reception side, Image data R, G, B and Bk and other associated signals received at a receiving portion 301 are stored in the R, G, B and Bk memories 303, in accordance with a selected one of the above four transfer modes. The stored data are then converted at a controlling portion 306 into an analog signal which is outputted to a monitor 307 or a printing unit 308 as desired. In the still image transceiver of this type, Bk data is calculated at the time of transmission so that the Bk memory is not used. Therefore, this Bk memory can be used as a memory for storing the drop-out position of a still image signal reproduced, particularly from a video floppy disc.

Figure 3:
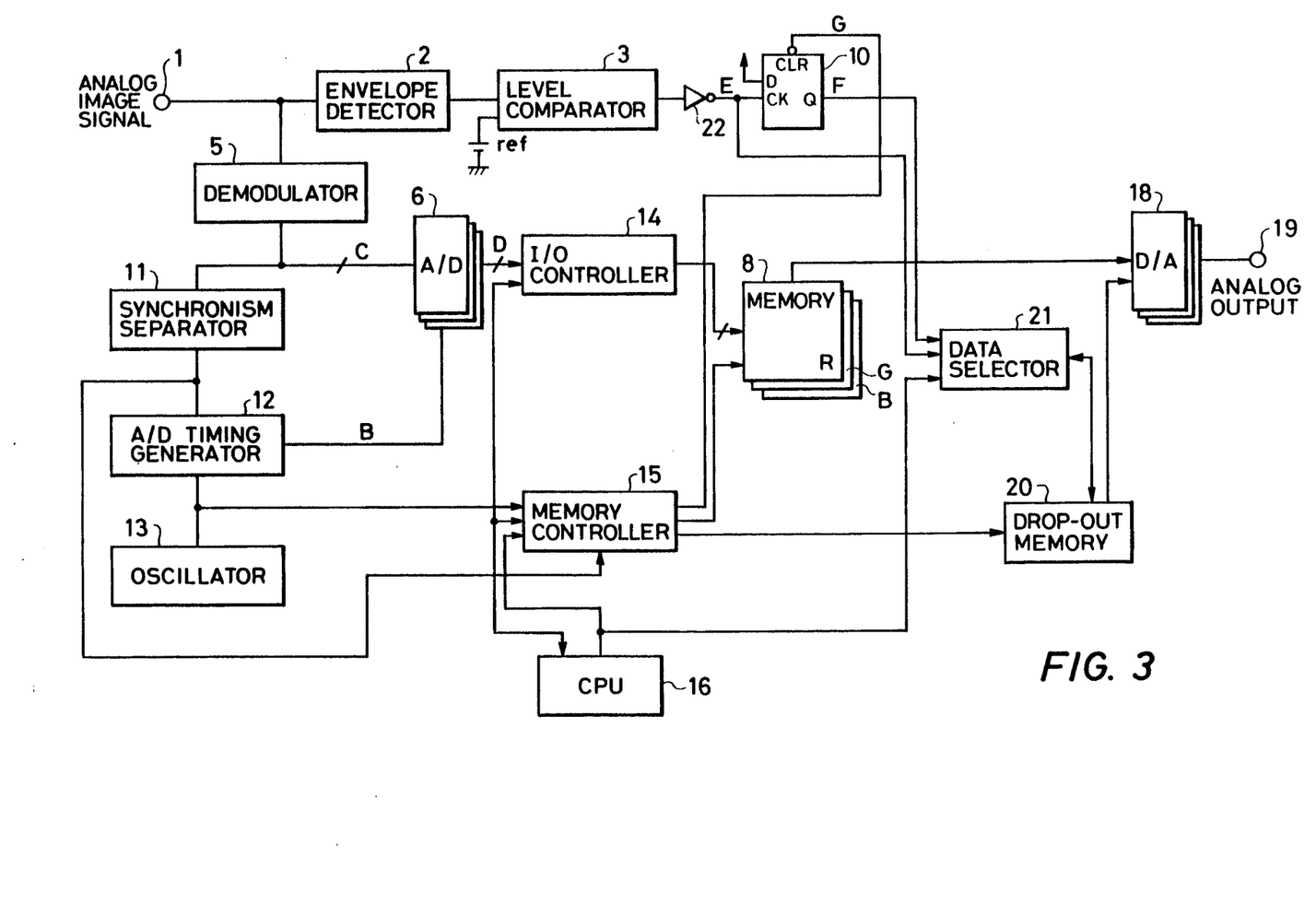
FIG. 3 is a block diagram showing the drop-out compensation system of the embodiment.
Figure 4:
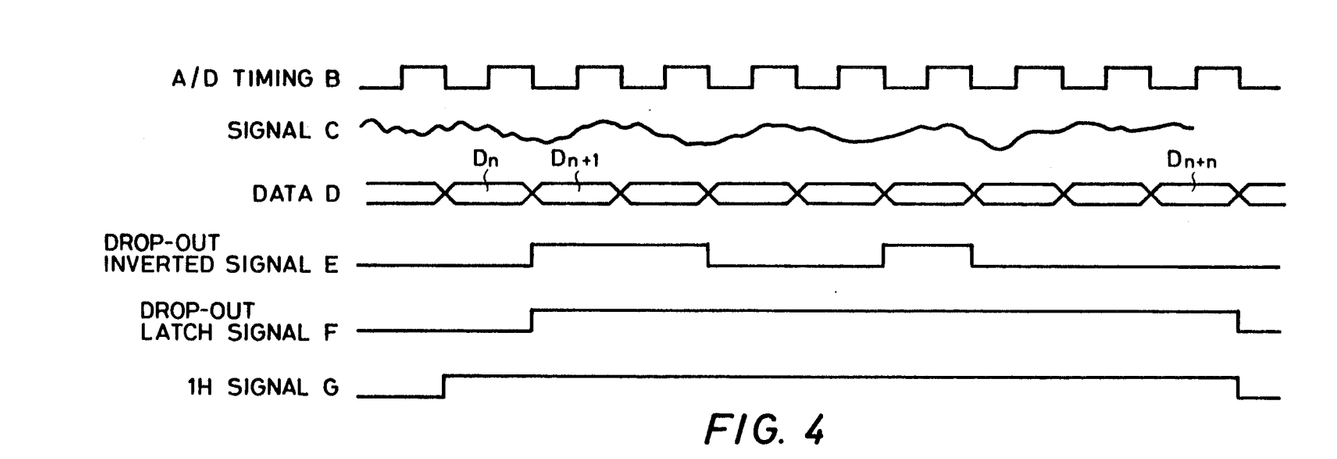
FIG. 4 is a timing chart for explaining the timings of detecting a drop-out.

The main circuit portion of this invention, particularly the circuit portion necessary for drop-out compensation in FIG. 1 is shown in FIG. 3 in block form. FIG. 4 is a timing chart illustrating the operation of the circuit portion of FIG. 3. The circuit portion comprises: an input terminal 1 for an analog image signal reproduced from a video floppy disc, for example; and envelope detector 2 for the reproduced analog image signal from the input terminal; a level comparator 3 for detecting a drop-out; an inverter 22 for inverting a drop-out signal; a drop-out latch 10 constructed of a D-F/F for latching the inverted drop-out pulse; a demodulator 5 for demodulating the analog image signal inputted to the input terminal 1 to obtain R, G and B color signals; a synchronism separator 11 for separating a synchronism signal of the analog image signal; an A/D timing generator 13 for setting the start timing of A/D conversion and the like, based on a separated synchronism signal; an oscillator 13 for supplying reference clocks to the A/D timing generator 12 and a memory controller 15 described later; an A/D converter for converting the analog R, G and B color signals demodulated by the demodulator 5 into a digital signal; and I/O controller 14 for controlling the input/output of data converted by the A/D converter and data from the CPU 16; the memory controller 15 supplied with clocks from the oscillator for generating addresses and timings used in writing data in a memory 8 and a drop-out memory 20; a D/A converter for D/A converting data from the memory 8 and the drop-out memory 20; an output terminal 19 from which the D/A converted analog image signal is outputted; the drop-out memory 20 corresponding to the Bk memory 303 of FIG. 1; and a data selector 21 for switching the output from the drop-out latch 10, the drop-out pulse and the data to write a desired one into the drop-out memory 20.

Next, the operation of the embodiment shown in FIG. 3 will be described with reference to FIG. 4. An RF signal reproduced from a floppy disc is applied to the input terminal and sent to the envelope detector 2 to detect the envelope which is inputted to the level comparator 3. The level comparator 3 outputs a low level signal when the envelope level becomes lower than a drop-out detection level. The output from the comparator 3 is inverted by the inverter 22 to become signal E. Namely, when a drop-out is detected, the signal E of high level is outputted. The drop-out pulse E is inputted to both the data selector 21 and the drop-out latch 10 which is cleared by a clear signal G at its trailing edge, generated by the memory controller 15 at each period 1H. After the drop-out latch 10 is cleared, it outputs a signal F of high level upon reception of a next drop-out pulse E and latches the signal F of high level until it is cleared. The latched signal F is inputted to the data selector 21. The RF signal inputted to the input terminal 1 is demodulated by the demodulator 5 to become a demodulated image signal C which is fed to the A/D converter 6. The demodulated image signal C is also fed to the synchronism separator to derive therefrom a synchronism signal which is supplied to the memory controller 15 and the A/D timing generator 12. A timing pulse B is supplied from the A/D timing generator to the A/D converter in synchronism with a clock from the oscillator 13. Then, the demodulated image signal is A/D converted to obtain a digital signal D which is inputted to the I/O controller 14.

The memory controller 15 generates addresses used in writing data into or reading data from the memory 8, exchanges addresses between the CPU 16, and generates clear signals at each period 1H. The A/D converted image signal D is written via the I/O controller 14 into the image memory 8 with necessary addresses and timings being supplied thereto from the memory controller 15.

Figure 5:
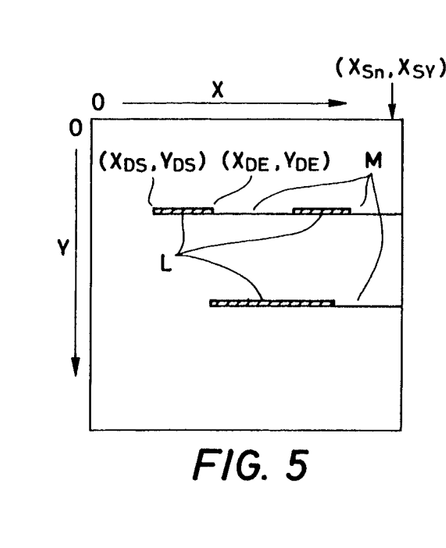
FIG. 5 shows an example of a displayed view by which the drop-out status is visually recognized.

Simultaneously when the demodulated image signal is written in the image memory 8, the latched drop-out signal F and the drop-out signal E are written into the drop-out memory 20 (Bk memory) via the data selector 21. In this case, the latched drop-out signal F is added to the lower bit, e.g., bit 0 of a data line in the drop-out memory 20, whereas the drop-out signal E is written to the upper bit, e.g., bit 7, the other bits 1 to 6 are fixed at 0. The data from the image memory 8 and the drop-out memory 20 are supplied to the A/D converter 18 where they are converted into an analog signal which is outputted from the output terminal 19. The image and the drop-out can be viewed by monitoring the analog signal from the output terminal 19. FIG. 5 shows an example of a displayed drop-out indication with the signal read out from the drop-out memory through the D/A converter 18 being monitored. An occurrence of a drop-out can be confirmed by high-lighted portions indicated by L where the drop-out signals E have been added to the upper bits of the drop-out memory 20. Although the latched drop-out signal F has been added to the lower bits upto the last location of the memory, the portions indicated by M are of low brightness and they are almost imperceptible.

After the image signal and the drop-out signal E have been stored in the image memory 8 and the drop-out memory 20, respectively, the CPU 16 controls, upon reception of a drop-out compensation command during the operation flow described later, the I/O controller 14, the memory controller 15 and the data selector 21. The image data in the image memory is corrected in accordance with the drop-out information in the drop-out memory 20, in cooperative association with the image memory 8 and the drop-out memory 20 and the CPU 16. The corrected image data in the image memory 8 are again converted into an analog signal at the D/A converter 18 in synchronism with the timings obtained from the memory controller 15 to be outputted from the output terminal for monitoring it. Thus, the images before and after drop-out compensation can be compared each other.

The drop-out compensation method for the data in the memory 8 as executed above will now be described with reference to FIGS. 6A and 6B. At step S1, the contents of address counters for counting the addresses of the drop-out memory 20 are set such that Xsx is the last address in the X direction of the memory and Ysn is 0. Further an YCN counter for addressing drop-out buffer in the CPU 16 is initialized. Next, at step S2, to find a line where a drop-out is present, first the X coordinate is set at Xs, i.e., at the end location in the X direction as seen in FIG. 4. Then, data at an address (Xsx, Ysn) is read from the drop-out memory 20 and stored in a data register Ds. At step S3, the Y coordinate Ysn is incremented for preparation of reading the next data. At step S4, it is checked if the data (loaded in the data register Ds) read at step S2 is a drop-out data (1) or not (0). If not a drop-out, then the flow branches to step S8 to check if Ysn is the last line. If not, the flow returns to step S2 to repeat the above steps S2 to S4. If there is no drop-out and the Y coordinate Ysn is the last line, then the flow advances to step S9. If the contents of the data register Ds are not 0 at step S4, since there is at least one drop-out in the line at the Y coordinate Ysn in the X direction, the Ysn value is stored at step S5 in the head area of the drop-out buffer indicated by the counter YCN which is incremented each time a drop-out line is found. Next, at step S6 the counter YCN is incremented by one for preparation of the next drop-out buffer address. At step S7, it is checked if the count of the counter YCN is smaller than N1 which is a maximum allowable number of drop-out lines. If affirmative and if the Ysn is not the last line, then the flow returns to step S2. In this manner, while the Ysn is incremented, searching a drop-line continues and the Y coordinate Ysn at a drop-line is stored. If the Ysn becomes more than N1 which is the maximum allowable number of drop-out lines, the drop-out detection routine is terminated.

Figure 6A:
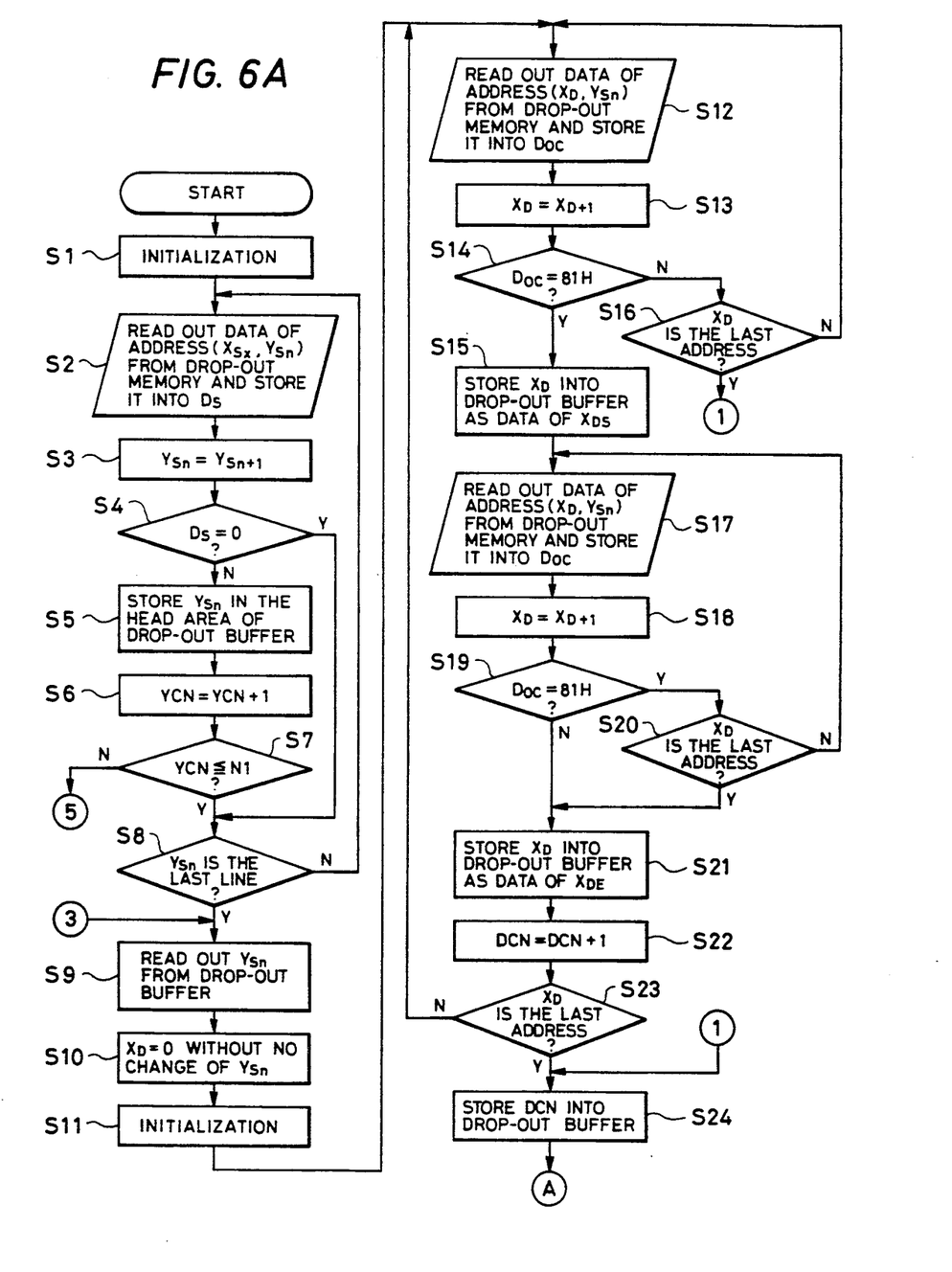
FIGS. 6A and 6B are flow charts illustrating the operation of drop-out compensation.
Figure 7:
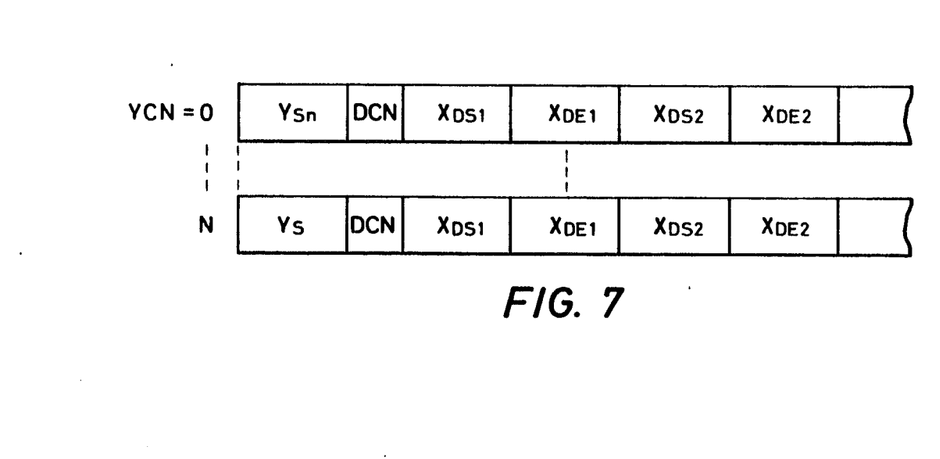
FIG. 7 is a drop-out buffer map.

If the Ysn is the last line at step S8, then at step S9 an Ysn is read from the drop-out buffer indicated by the YCN counter. To find a drop-out at the Ysn coordinate line in the X direction, the X coordinate Xd is set at 0 at step S10. At step S11, a drop-out register Doc and a drop-out counter DCN are initialized. At step S12, the data at the address (Xs, Ysn) is read from the drop-out memory and stored in the drop-out register Doc. At step S13, the Xd address is incremented to the next X coordinate. At step S14, it is checked if the contents of the data read at step S12 is 81H or not. As described before, the drop-out signal E is inserted at MSB, and the latched drop-out signal F at LSB. Therefore, the data is 81H if a drop-out is present, and 00H if not present. Thus, it can be decided that if the contents of the drop-out register are not 81H, there is no drop-out. In case of 81H, the flow advances to step S16 from step S14 to check if the Xd is the last address in the X direction. If not, the flow returns to step S12 to check a drop-out at the next Xd address. If the Xd is the last address, the flow advances to step S24. If the Xd is 81H at step S14, then at step S15 the Xd address is stored as a first-found drop-out data Xds in the drop-out buffer having loaded the Ysn now concerned, the data Xds being loaded as shown in FIG. 7.

Since the Xd address has been incremented by one at step S13, the data at the next address (Xd, Ysn) is read from the drop-out memory and stored in the drop-out register Doc at step S17. After the Xd address is incremented at step S18 for preparation of reading further data, it is checked at step S19 if the contents of the data in the drop-out register Doc read at step S17 are 81H or not. If 81H, the drop-out still continues so that at step S20, if the Xd is the last address or not, is checked. If not, the flow returns to step S17 to check the data at the next address Xd. If the Xd is the last address, the flow advances to step S21. If the contents of the drop-out register Doc is not 81H at step S19, it means that a drop-out terminates. Then, at step S21, the data Xd is stored as the drop-out end data Xde in the drop-out buffer having loaded the Ysn concerned, the end data Xde being loaded as shown in FIG. 7 following the first-found drop-out data Xds. Next, since a drop-out has been found in the above steps, the drop-out counter DCN is incremented by one at step S22. It is checked if the Xd is the last address at step S23. If not, the flow returns to step S12 to repeat the above steps. If affirmative, the flow advances to step S24 where the number of drop-outs is stored at a drop-out number area in the drop-out buffer having loaded the Ysn concerned, the number being loaded as shown in FIG. 7.

Figure 6B:
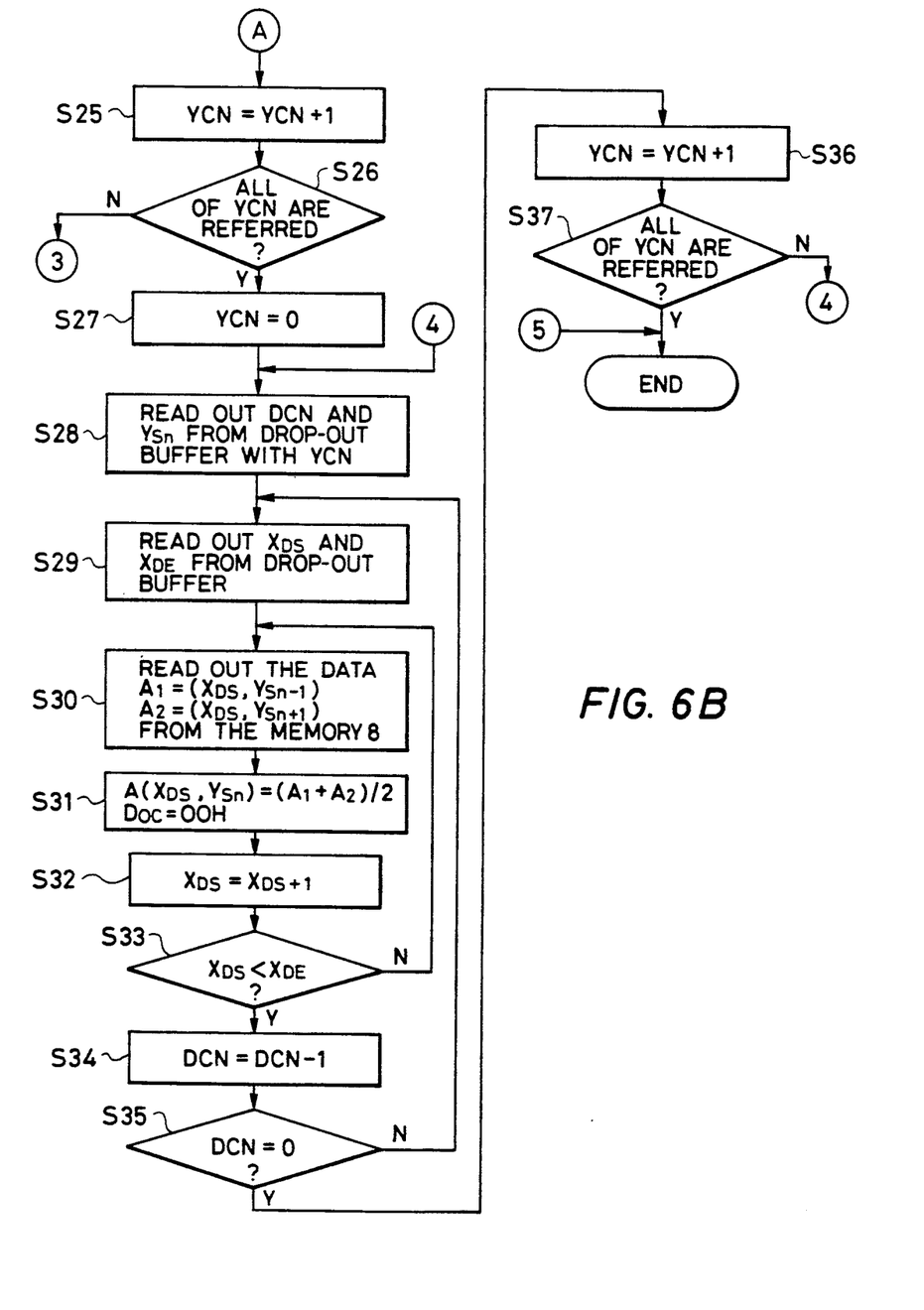

Next, at step S25 shown in FIG. 6B, the contents of the YCN counter are incremented by one to find a drop-out in the next line in its X direction. It is checked at step 26 if all of the lines as indicated by the YCN counter are still completed. If not, the flow returns to step S9 to repeat the above steps. In this manner, the data and number of drop-outs in all of the lines where a drop-out or drop-outs are present are stored in the drop-out buffer.

Thereafter, the contents of the YCN counter are initialized. Then at step 28, the drop-out number DCN and Y coordinate address Ysn are read from the drop-out buffer at the address indicated by the YCN counter. Based on the read-out DCN and Ysn, the start address Xds and end address Xde of a drop-out are read at step S29. At step S30, data A1=(Xds, Ysn−1) and A2=(Xds, Ysn−1) are read from the image memory 8, the data corresponding to the two coordinates on the lines preceding and succeeding the line at the start address Xds. At step S31, an average value or an interpolation value of A1 and A2, i.e., $(A1+A2)/2$, is calculated. This value is used as a compensation data A(Xds, Ysn) and replaced with the data in the memory 8. Thereafter, a drop-out flag is cleared to rewrite the contents of the drop-out register Doc to 00H. Next, at step S32, the Xds is incremented by one for preparation of the next drop-out interpolation. It is checked at step S33 if the interpolation is completed upto the end of the drop-out. If not, the flow returns to step S29 to repeat the above steps. If completed, then at step S34, the drop-out number counter DCN is decremented by one. If all the number of drop-outs are not completed at step S35, the flow returns to step S29 to perform next interpolation. If affirmative, the drop-out buffer counter YCN is incremented by one at step S36. It is checked at step S37 if all the lines where a drop-out is present have been checked and interpolated. If not, the flow returns to step S28 to repeat the above steps. If affirmative, the above sequence terminates.

In another embodiment of this invention, the Bk memory is arranged such that it is not used when a video floppy reproduced signal is used as an input signal.

Figure 8:
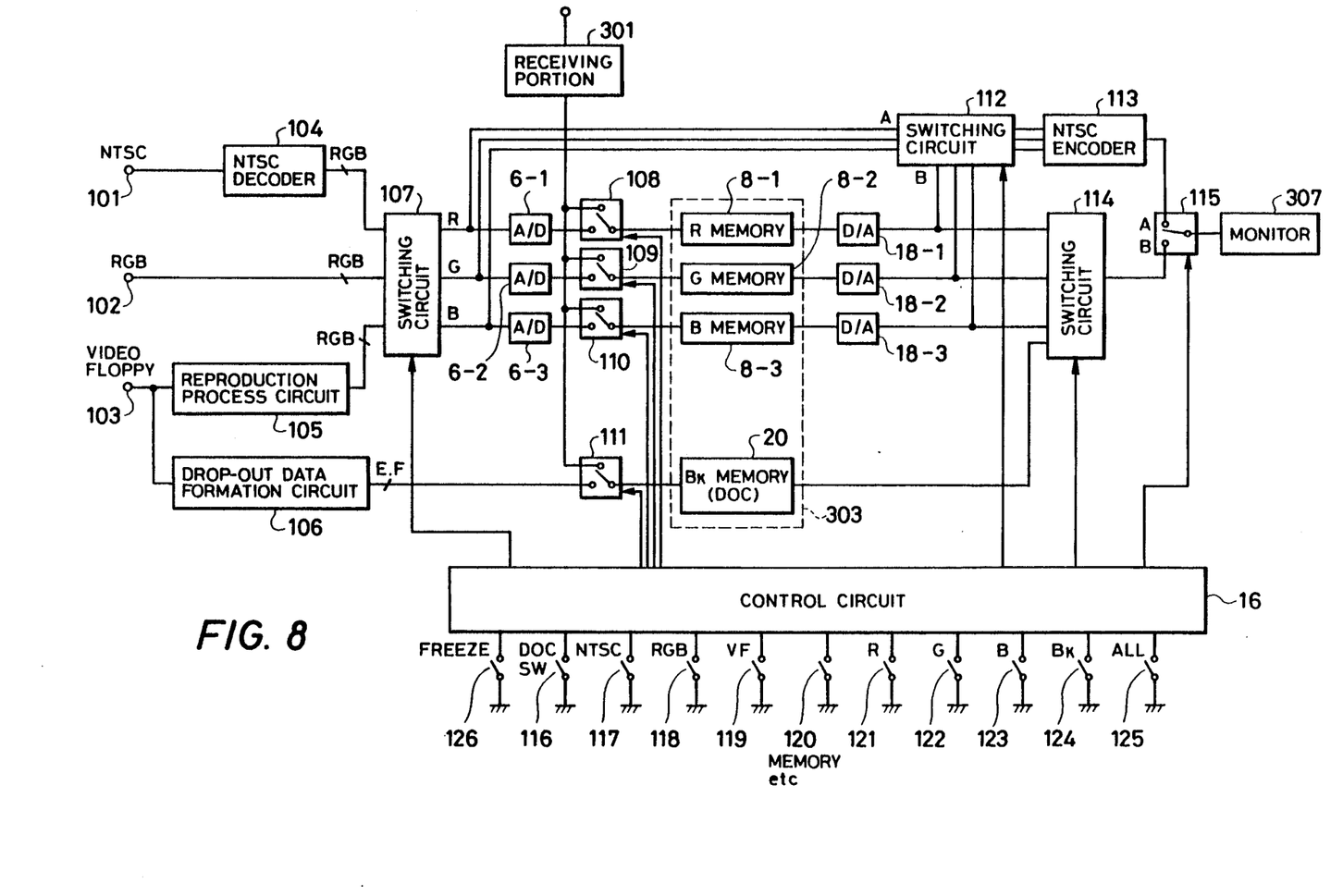
FIG. 8 is a block diagram of the circuit for switching a monitor mode.

FIG. 8 is a detailed block diagram of the circuit for switching a monitor mode between a memory and an external input signal. Blocks having the same function as those in FIGS. 1 and 3 are represented by identical reference numerals.

As an external input signal, an NTSC signal (at input terminal 101), and RGB signal (at input terminal 102), and a video floppy reproduced signal (at input terminal 103) may be used. The NTSC signal and the video floppy reproduced signal are passed through an NTSC decoder 104 and a reproduction process circuit 106, respectively, to be applied to a switching circuit 107 in the form of RGB signals. The output of the switching circuit 107 which is controlled under the control circuit 16 is supplied to the input side A of a switching circuit 112, and to one terminals of switching circuits 108 to 110 via A/D converters 6-1 to 6-3. The video floppy reproduced signal is also supplied to a drop-out data formation circuit 106 including the envelope detector 2, level comparator 3, D-FF 10 and inverter 22 shown in FIG. 3, and to an one end terminal of a switching circuit 111. The output of a receiving portion 301 is supplied to the other terminals of the switching circuits 108 to 111. The outputs of the switching circuits 108 to 111 are supplied to R, G, B and Bk memories. The outputs from the R, G and B memories are supplied to the input side B of the switching circuit 112 via the respective D/A converters 18-1 to 18-3, and together with the output from the Bk memory, to a switching circuit 114. The output of the switching circuit 112 under control of the control circuit 114 is fed to an NTSC encoder 113 to be converted into an NTSC signal and thereafter, it is supplied to a monitor 307 via the input side A of the switching circuit 115. The switching circuit 114 under control of the controller 16 selects one of the four input signals to output it to the monitor 307 via the input side B of the switching circuit 115. The control circuit 16 is connected with the following switches: a freeze switch 126 for freezing the NTSC, RGB and video floppy reproduced signals in the memory 8; DOC switch 116 for the above-described drop-out compensation operation using drop-out information stored in the Bk memory; NTSC switch 117 for switching the NTSC, RGB, and video floppy reproduced signal; an RGB switch 118, a VF (video floppy) switch 119; a switch 120 for switching a memory reproduced signal and the above three input signals, to be supplied to the monitor; an R switch 121 for inputting a memory reproduced signal from the R, G, B and Bk memories and an ordinary memory reproduced signal from the R, G and B memories to the monitor; a G switch 122; a B switch 123, a Bk switch 124; and an ALL switch 125.

Figure 9:
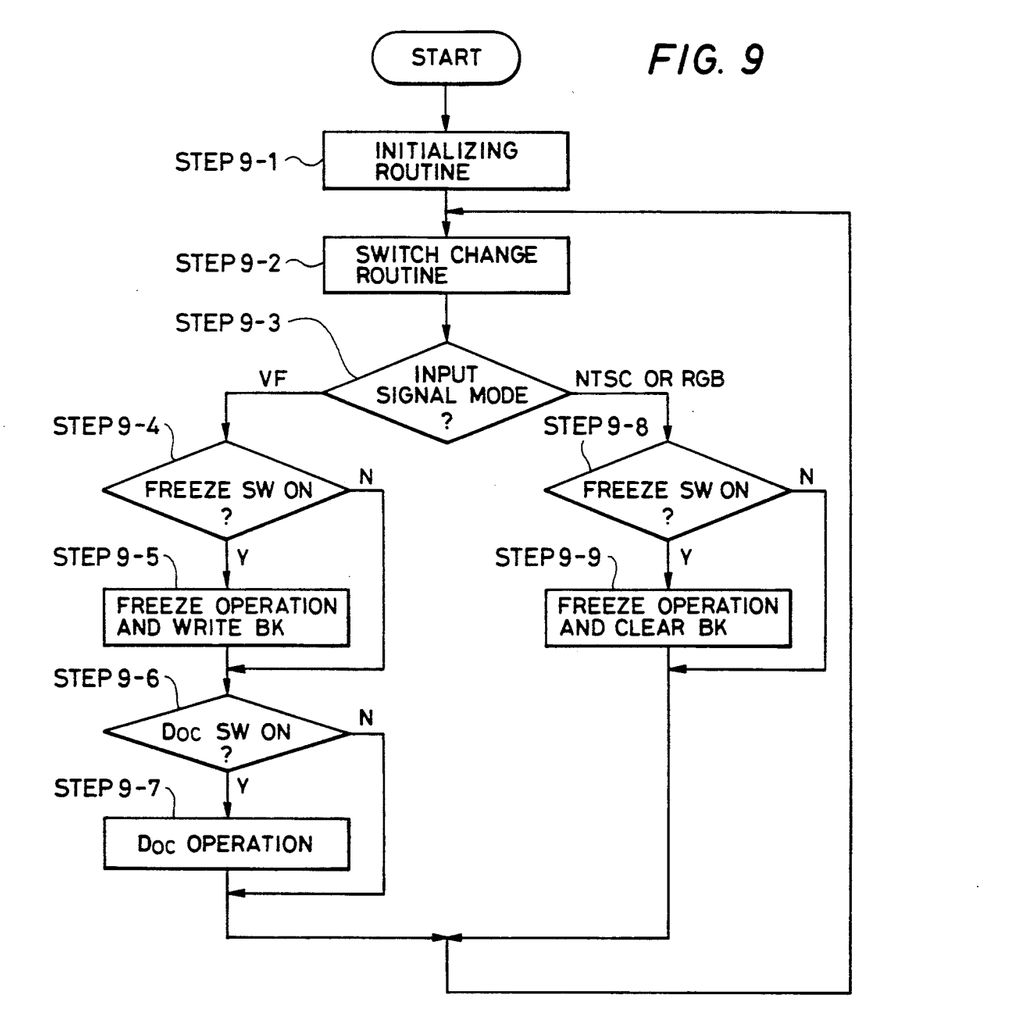
FIGS. 9 and 10 are flow charts illustrating the operation of the circuit of FIG. 8.

FIG. 9 is a flow chart for explaining the fundamental operation of the circuit shown in FIG. 8.

At initialization routine Step 9-1, the switching circuit 107 is connected to the video floppy side, the switching circuits 108 to 111 to the input signal side, the switching circuit 112 to the input signal side A, the switching circuit 111 to the Bk memory, and the switching circuit 115 to the input signal side A. The switching circuits 108 to 111 are connected to the receiving portion side only during a reception mode, and they are always connected to the input signal side in the following switch change routine.

Figure 10:
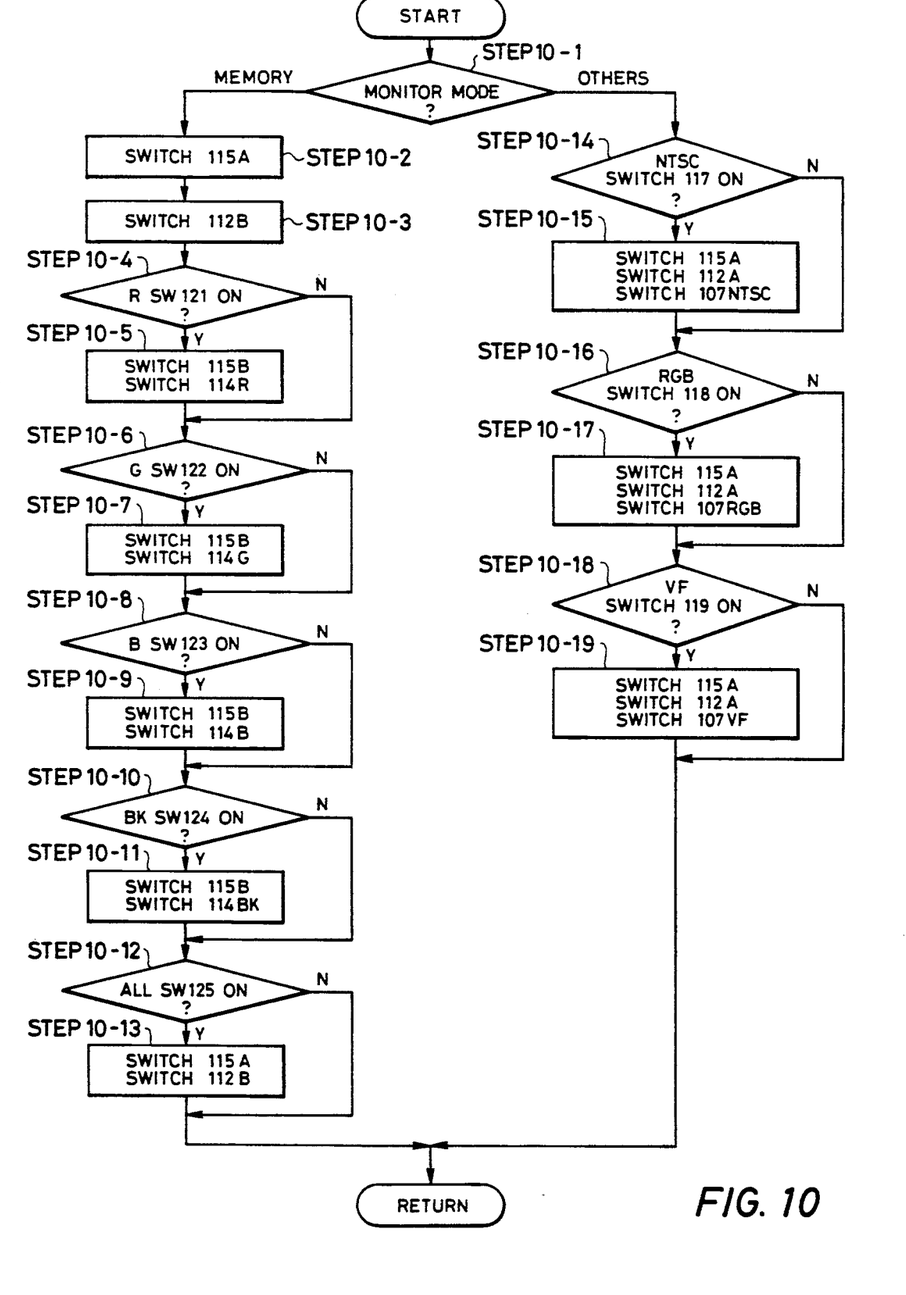

Next, the switch change routine shown in FIG. 10 will be described which flow is branched depending upon a status of the switch 120 connected to the control circuit 16.

The flow branches at monitor mode Step 10-1 into Step 10-2 or Step 10-14 depending upon the status of the switch 120.

At the memory side of the monitor mode, the switching circuit 115 is connected to the A side (Step 10-2), and the switching circuit 112 to the B side (Step 10-3). Next, it is detected if the R switch 121 is turned on. If it is turned on, the switching circuit 115 is connected to the B side and the switching circuit 114 to the R memory, to thereby supply the R memory reproduced signal to the monitor 307. Similar controls are executed at Steps 10-6 to 10-13 to supply respective memory reproduced signals to the monitor 307.

Alternatively, at the other side of the monitor mode, it is detected if the NTSC switch 117, RGB switch 118 and VF switch are turned on. If they are turned on, the switching circuit 115 is connected to the A side, the switching circuit 112 to the A side, the switching circuit 107 to the NTSC, RGB, and VF input side, to thereby supply the respective input signals to the monitor 307.

After the switch change as above, the flow branches at input signal mode Step 9-3 to Step 9-4 or Step 9-8 depending on which one of the input signals (NTSC signal, RGB signal and VF signal) has been selected by the switching circuit 107.

In case of a VF signal, it is checked if the freeze switch 126 is turned on. If it is turned on, the video floppy reproduced signal is frozen in the R, G and B memories to write the above-described drop-out data in the Bk memory (Step 9-5).

Thereafter, if it is detected that the DOC switch 116 is turned on, the drop-out compensation steps S28 to S37 shown in FIG. 6A are executed (Step 9-7).

In case of an external input signal, i.e., an NTSC signal or an RGB signal, it is detected if the freeze switch 126 is turned on. If it is turned on, the input signal is frozen in the R, G and B memories, and the Bk memory is cleared (Step 9-9).

If it is detected that the DOC switch is not turned on after Step 9-5, since the switching circuits 114 and 115 have been connected as described above, the contents of the Bk memory where the drop-out locations are stored are read and displayed on the monitor 307 as shown in FIG. 5.

As described so far, in contrast with the drop-out compensation circuit using a 1H delay line, the above embodiment performs drop-out compensation without interchanging the 1H delayed signal and the signal at the drop-out line. Therefore, distortion in the image at the start and end of a drop-out is not generated. Further, the positions of drop-outs remain stored in the drop-out memory in one-to-one correspondence therebetween so that the positions can be easily recognized on the monitor. Furthermore, instead of merely interchanging the drop-out line with that period 1H before, the average value of lines preceding and succeeding the drop-out line may be used for interpolation as in the above embodiment, or other various methods may be adopted so that compensation can be attained with high fidelity.

In addition, in the above embodiment, the drop-out flag is cleared each time a drop-out compensation has been completed. Therefore, if the Bk memory is monitored during a drop-out compensation, the drop-out compensation which is now carried out can be visually recognized.

As seen from the foregoing description of the present invention, since the drop-out period and position of a reproduced image signal is detected while storing the image signal in a memory, the user can visually recognize on a display the positions and periods of drop-outs. For example, while storing an image signal reproduced from a magnetic recording medium, drop-outs during the regeneration can be displayed and hence it is possible to check easily if the reproduction has been performed in good conditions.

What is claimed is:

1. An image signal compensating apparatus comprising:

means for detecting, while an image signal is stored in a memory, where and how long a drop-out occurs in the image signal; and means for displaying an indication of periods during which drop-outs detected by said detecting means occur, wherein said displaying means displays said periods and displays a visible image based on the image signal.

2. An apparatus according to claim 1, wherein said signal drop-out detecting means includes a two-dimensional memory which stores drop-outs detected by said detecting means with information representative of where said detected drop-outs occur.

3. An apparatus according to claim 2, wherein said detecting means writes said information representative of where said detected drop-outs occur into said two-dimensional memory at addresses corresponding to the positions where said detected drop-outs occur.

4. An apparatus according to claim 1, wherein said display means displays all of the detected drop-outs of one picture image signal by indicating where and how long each of the drop-outs occurs in the picture.

5. An image signal compensating apparatus comprising:
   means for detecting, while an image signal is stored in a memory, where and how long a drop-out occurs in the image signal;
   means for displaying an indication of periods during which drop-outs detected by said detecting means occur, wherein said displaying means displays said periods and displaying a visible image based on the image signal; and
   means for generating information which designates said period based on said signal drop-out period and storing the information in memory.

6. An apparatus according to claim 5, wherein said signal drop-out detecting means includes a two-dimensional memory which stores drop-outs detected by said detecting means with information representative of where said detected drop-out occur.

7. An apparatus according to claim 6, wherein said detecting means writes said information representative of where said detected drop-outs occur into said two-dimensional memory at addresses corresponding to the positions where said detected drop-outs occur.

8. An apparatus according to claim 7, wherein said information generating means generates said information designating said drop-out period according to said information which is representative of where said detected drop-outs occur and which is stored in said two-dimensional memory.

9. An apparatus according to claim 8, wherein said information designating the period when the drop-out occurs includes information representative of the start and end positions of said period.

10. An apparatus according to claim 5, wherein said display means displays all of the detected drop-outs.

11. An apparatus according to claim 5, further comprising means for searching a signal drop-out position of said image signal based on the information generated by said information generating means.

12. An apparatus comprising:
   a) reproduction means for reproducing information from a medium in which said information is stored;
   b) detection means for detecting where and how long a drop-out occurs in said reproduced information;
   c) storing means for storing in a memory said reproduced information reproduced by said reproduction means;
   d) control means for generating data representing periods of the drop-outs detected by said detection means and storing said data in said memory with data which is used to search the periods while said reproduced information is stored by said storing means.

13. An apparatus according to claim 12, wherein said information is an image signal.

14. An apparatus according to claim 13, wherein said image signal is a two-dimensional image signal including horizontal and vertical components.

15. An apparatus according to claim 12, wherein said detection means detects said drop-out periods by detecting a level of said information reproduced by said reproduction means.

16. An apparatus according to claim 12, wherein the data which is used to search the periods is different from the data representing drop-out periods.

17. An image signal compensating apparatus comprising:
   a) area memory means for storing an image signal of a picture image of a predetermined area;
   b) detection means for detecting drop-outs of the image signal and for generating a detection signal representing detection of such a drop-out; and
   c) writing means for writing, responsive to the detection signal, a predetermined identification signal into a position which is an edge portion of a storing area of said area memory means and an end portion of a line where the drop-out is detected.

18. An apparatus according to claim 17, further comprising read-out means for reading out a signal of the edge portion of the storing area of said area memory means to discriminate where drop-outs occur in the image signal stored in said area memory means.

19. An apparatus according to claim 18, further comprising discrimination means for discriminating where drop-outs occur according to the signal read out by read out means.

20. An apparatus according to claim 19, further comprising compensation processing means for performing compensation processing of signal of a position where occurrence of a drop-out is discriminated by said discrimination means.

21. An apparatus according to claim 17, wherein said area memory means stores a digital image signal converted from an analog image signal.

22. An apparatus according to claim 21, wherein said detection means detects drop-outs by discriminating a level of the analog image signal.

23. An apparatus according to claim 17, wherein said writing means writes the identification signal into the storing area of said area memory means by means of a central processing unit.

24. An image signal processing apparatus comprising:
   a) means for detecting where a defect occurs in an image signal, while the image signal is being supplied from an external source;
   b) means for displaying positions of defects, said display means displaying where the defects occur in a picture formed by the image signal, wherein said displaying means displays said positions and displays a visible image based on the image signal, and
   c) means for selectively processing the image signal in accordance with the detected defects.

25. An apparatus according to claim 24, wherein said detecting means includes a two-dimensional memory which stores defects detected by said detecting means with information representative of where the detected defects occur.

26. An apparatus according to claim 25, wherein said detecting means writes the information representative of where the detected defects occur into said two-dimensional memory at addresses corresponding to the positions where the detected defects occur.

27. An apparatus according to claim 24, wherein said display means displays all of the detected defects of one picture image signal by indicating where and how long each of the defects occurs in the picture.

28. An apparatus according to claim 24, further comprising reproduction means for reproducing the image signal from a storage medium.

29. An apparatus according to claim 24, wherein said detecting means performs detection by comparing the image signal with a predetermined signal.

30. An image signal processing apparatus comprising:

a) means for detecting where a defect occurs in an image signal while the image signal is being supplied from an external source;
b) means for memorizing portions of the image signal where defects occur;
c) supply means for supplying information to a monitor in order to cause the monitor to display where the portions memorized in said memorizing means occur in a picture formed by the image signal, wherein said displaying means displays said periods and displays a visible image based on the image signal, and
d) means for selectively processing the image signal in accordance with the detected defects.

31. An apparatus according to claim 30, wherein said memorizing means is a two-dimensional memory.

32. An apparatus according to claim 31, wherein said supply means supplies the information by reading out data memorized in said memorizing means and supplying the read-out data to the monitor.

* * * * *

UNITED STATES PATENT AND TRADEMARK OFFICE
CERTIFICATE OF CORRECTION

PATENT NO. : 5,148,291
DATED : September 15, 1992
INVENTOR(S) : NORIO KIMURA, ET AL.

It is certified that error appears in the above-identified patent and that said Letters Patent is hereby corrected as shown below:

COLUMN 1

Line 34, "the" should read --for the--.
Line 55, "consecutive several" should read --several consecutive--.
Line 63, "the" should read --for the--.

COLUMN 2

Line 2, "which is" should be deleted.
Line 12, "compensating" should read --compensating for--.
Line 68, "302," should read --302-- and "side," should read --side.--.

COLUMN 3

Line 29, "ator 13" should read --ator 12--.

COLUMN 4

Line 28, "A/D" should read --D/A--.
Line 36, "high-lighted" should read --highlighted--.
Line 40, "upto" should read --up to--.
Line 42, "most" should read --most visually--.
Line 59, "each" should read --with each--.

COLUMN 6

Line 23, "step 28," should read --step S28,--.
Line 40, "upto" should read --up to--.
Line 66, "circuit 106," should read --circuit 105,--.

UNITED STATES PATENT AND TRADEMARK OFFICE
CERTIFICATE OF CORRECTION

PATENT NO. : 5,148,291
DATED : September 15, 1992
INVENTOR(S) : NORIO KIMURA, ET AL.

It is certified that error appears in the above-identified patent and that said Letters Patent is hereby corrected as shown below:

COLUMN 7

Line 3, "terminals" should read --terminal of each--.
    Line 8, "an" should be deleted.
    Line 18, "circuit 114" should read --circuit 16--.
    Line 31, "signal;" should read --signals;--.
    Line 32, "118," should read --118;--.

COLUMN 8

Line 55, "is" should read --are--.
    Line 62, "conditions." should read --condition.--.

COLUMN 9

Line 28, "displaying" should read --displays--.
    Line 37, "drop-out" should read --drop-outs--.
    Line 66, "means;" should read --means; and--.

Signed and Sealed this

Second Day of November, 1993

*Attest:*

BRUCE LEHMAN

*Attesting Officer*     Commissioner of Patents and Trademarks